(12) United States Patent
Wang et al.

(10) Patent No.: US 8,731,765 B2
(45) Date of Patent: May 20, 2014

(54) METHOD AND APPARATUS FOR FAULT DETECTION IN A TORQUE MACHINE OF A POWERTRAIN SYSTEM

(75) Inventors: Wei D. Wang, Troy, MI (US); Bon Ho Bae, Torrance, CA (US); Reynaldo Arturo Suazo Zepeda, Redondo Beach, CA (US); Satish Godavarthy, La Palma, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 234 days.

(21) Appl. No.: 13/170,428

(22) Filed: Jun. 28, 2011

(65) Prior Publication Data

US 2013/0006453 A1 Jan. 3, 2013

(51) Int. Cl.
| | | |
|---|---|---|
| *G01M 17/00* | (2006.01) | |
| *G06F 11/30* | (2006.01) | |
| *G07C 5/00* | (2006.01) | |
| *G01R 31/02* | (2006.01) | |
| *G01R 31/14* | (2006.01) | |
| *H02H 3/04* | (2006.01) | |

(52) U.S. Cl.
USPC ......... 701/29.2; 701/29.1; 318/490; 318/689; 477/906; 702/117

(58) Field of Classification Search
USPC ............ 701/29.1, 22, 51, 99; 903/902; 318/3, 318/139, 445, 490–494, 521, 558, 689, 690, 318/700, 725, 727; 180/65.1; 477/3, 7, 906; 702/57, 117, 123
See application file for complete search history.

(56) References Cited

U.S. PATENT DOCUMENTS

| | | | | |
|---|---|---|---|---|
| 6,369,543 | B1 * | 4/2002 | Masselus et al. | 318/700 |
| 7,355,436 | B2 * | 4/2008 | Zehentner et al. | 324/765.01 |
| 2005/0050387 | A1 * | 3/2005 | Mariani et al. | 714/13 |
| 2005/0080527 | A1 * | 4/2005 | Tao et al. | 701/34 |
| 2007/0249461 | A1 * | 10/2007 | Tsuji et al. | 477/3 |
| 2009/0051309 | A1 * | 2/2009 | Rehm et al. | 318/494 |
| 2010/0060222 | A1 * | 3/2010 | Kezobo et al. | 318/490 |
| 2010/0236851 | A1 * | 9/2010 | Van Maanen et al. | 180/65.265 |
| 2010/0256851 | A1 * | 10/2010 | Mitsutani | 701/22 |
| 2011/0175619 | A1 * | 7/2011 | Bauer et al. | 324/510 |
| 2011/0235221 | A1 * | 9/2011 | Vogeli | 361/18 |
| 2012/0038304 | A1 * | 2/2012 | Yeh | 318/490 |
| 2012/0109431 | A1 * | 5/2012 | Wang et al. | 701/22 |
| 2012/0203405 | A1 * | 8/2012 | Wang et al. | 701/22 |
| 2012/0217920 | A1 * | 8/2012 | Singh et al. | 318/490 |
| 2012/0303189 | A1 * | 11/2012 | Namuduri et al. | 701/22 |
| 2013/0046426 | A1 * | 2/2013 | Tsukashima et al. | 701/22 |

OTHER PUBLICATIONS

U.S. Appl. No. 13/029,381, Michael Arnett.
U.S. Appl. No. 13/151,327, Ganley.
U.S. Appl. No. 13/152,380, Arnett.
U.S. Appl. No. 13/151,373, Haggerty.
U.S. Appl. No. 13/152,328, Whitney.
U.S. Appl. No. 13/170,428, Wang.

* cited by examiner

*Primary Examiner* — Fadey Jabr
*Assistant Examiner* — Courtney Heinle

(57) ABSTRACT

A method for operating a powertrain system including a torque machine mechanically coupled to an internal combustion engine includes, upon detecting a pending fault associated with a power switch configured to control power flow to the torque machine, disabling torque output from the torque machine and executing retry events. The retry events are iteratively executed with a debounce time period preceding each retry event. Presence of a fault associated with the power switch is detected when a quantity of the retry events during a time window exceeds a threshold.

19 Claims, 4 Drawing Sheets

METHOD AND APPARATUS FOR FAULT DETECTION IN A TORQUE MACHINE OF A POWERTRAIN SYSTEM

TECHNICAL FIELD

This disclosure is related to powertrain systems employing torque machines, internal combustion engines and automatic transmissions.

BACKGROUND

The statements in this section merely provide background information related to the present disclosure. Accordingly, such statements are not intended to constitute an admission of prior art.

Known vehicle powertrain system systems include one or more torque actuators coupled to transmissions that transfer torque to a driveline for tractive effort. Torque actuators include internal combustion engines and electric motor/generators. An electric motor/generator may be used in a belt-alternator-starter (BAS) system as a torque actuator in place of an alternator. BAS systems include a serpentine belt to transfer torque between the engine and the electric motor/generator. BAS systems use a high-voltage energy storage system supplying high-voltage electrical power through an inverter to an electric motor/generator.

Inverters employ power switches, e.g., integrated gate-drive transistors (IGBTs) to convert high-voltage DC electrical power to high-voltage AC power that is transferred to an electric motor/generator to generate torque for tractive effort and engine starting. Faults in such systems include line-to-line electric shorts and ground faults in any one of the inverter, the electric motor/generator, and a multi-phase power bus electrically connected between the inverter and the electric motor/generator. Faults associated with power switches and windings of the electric motor/generator may result in excess electric current flow through the various components, and an increased voltage magnitude across a collector and emitter of one or more of the power switches, referred to as desaturation. A desaturation condition is said to exist if the voltage magnitude across a collector and emitter of a power switch rises above a threshold, e.g., 5-8 volts when a gate-emitter voltage is high. Known control system responses to a desaturation fault include an immediate shutdown of the electric motor/generator. Known systems are configured to monitor power switch collector-emitter voltages to detect desaturation faults, and include control systems to effect immediate shutdown of the electric motor/generator upon detection of a fault. Powertrain systems are exposed to external disturbances including electromagnetic interference (EMI) that may trigger false detection of a fault and an associated immediate shutdown of the electric motor/generator that is unnecessary.

SUMMARY

A powertrain system includes a torque machine mechanically coupled to an internal combustion engine. A method for operating the powertrain system includes disabling torque output from the torque machine and executing retry events upon detecting a pending fault associated with a power switch configured to control power flow to the torque machine. Each retry event is executed subsequent to a debounce time period. Presence of a fault associated with the power switch is reported when a quantity of retry events during a time window exceeds a threshold.

BRIEF DESCRIPTION OF THE DRAWINGS

One or more embodiments will now be described, by way of example, with reference to the accompanying drawings, in which.

DETAILED DESCRIPTION

Figure 1:
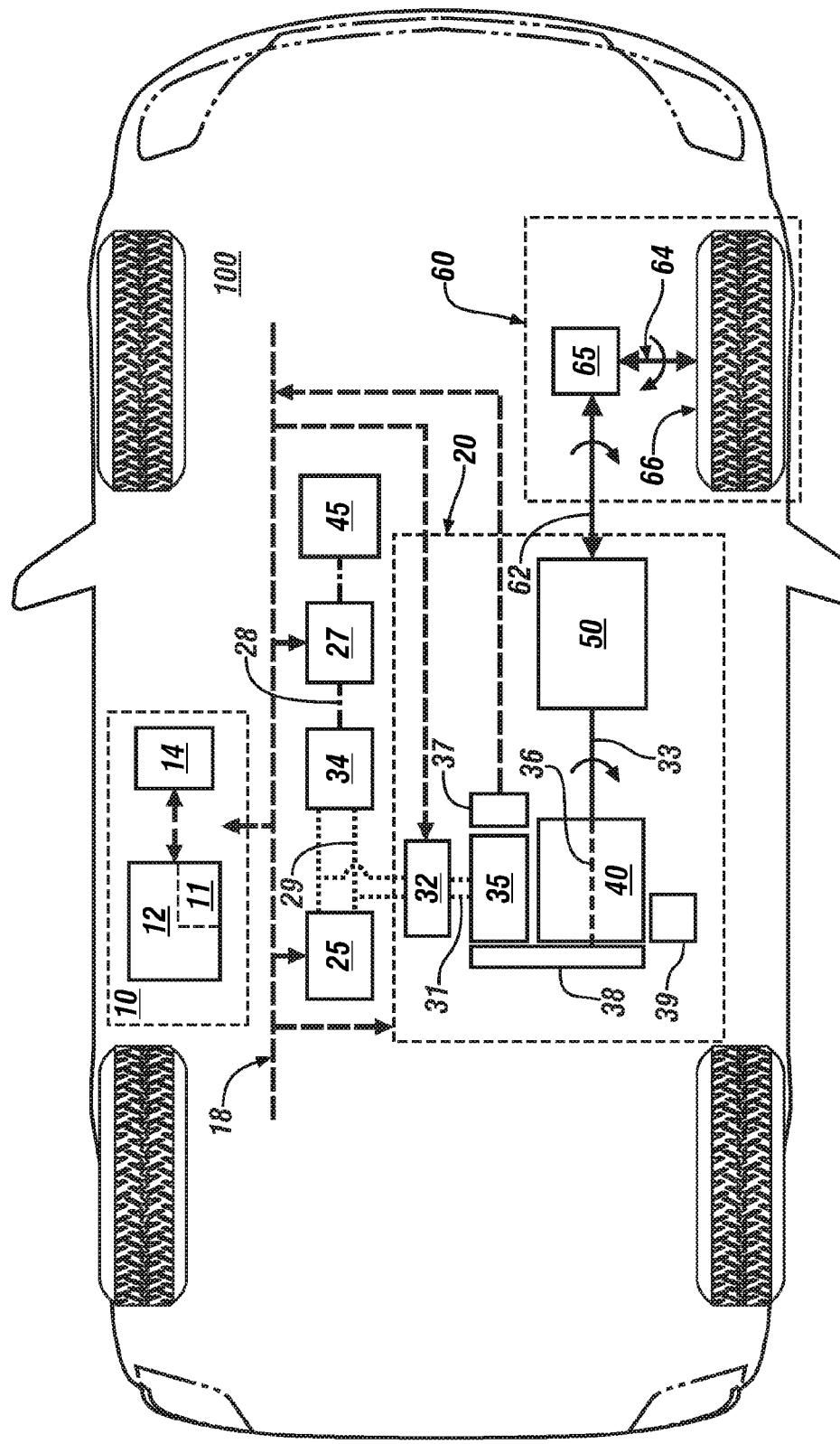
FIG. 1 illustrates a vehicle including a powertrain system including an electrically-powered torque machine mechanically coupled to an internal combustion engine that mechanically couples to a transmission and is controlled by a control system in accordance with the disclosure.

Referring now to the drawings, wherein the showings are for the purpose of illustrating certain exemplary embodiments only and not for the purpose of limiting the same, FIG. 1 schematically shows a vehicle 100 including a powertrain system 20 coupled to a driveline 60 and controlled by a control system 10. Like numerals refer to like elements throughout the description.

The powertrain system 20 includes an electrically-powered torque machine 35 mechanically coupled to an internal combustion engine 40 that mechanically couples to a transmission 50. The electrically-powered torque machine 35 and the internal combustion engine 40 are torque actuators. The electrically-powered torque machine 35 mechanically couples to the engine 40 via a belt-alternator-starter mechanism 38 that mechanically couples to a crankshaft 36 of the internal combustion engine 40 and provides a mechanical power path therebetween. The crankshaft 36 of the internal combustion engine 40 mechanically couples to an output member 33 that mechanically couples to the transmission 50. The transmission 50 includes an output member 62 that couples to the driveline 60. In one embodiment, the belt-alternator-starter mechanism 38 includes a serpentine belt routed between a pulley attached to the crankshaft 36 of the engine 40 and another pulley attached to a rotating shaft coupled to a rotor of the torque machine 35. The aforementioned elements form a belt-alternator-starter (BAS) system.

The engine 40 is preferably a multi-cylinder internal combustion engine that converts fuel to mechanical power through a combustion process. The engine 40 is equipped with a plurality of actuators and sensing devices for monitoring operation and delivering fuel to form a combustion charge to produce torque that is responsive to an operator torque request. The engine 40 preferably includes a low-voltage solenoid-actuated electrical starter 39 for starting in response to a key-crank event.

The torque machine 35 is preferably a multi-phase electric motor/generator configured to convert stored electric energy to mechanical power and convert mechanical power to electric energy that may be stored in a high-voltage battery 25.

The torque machine 35 includes a rotor and a stator and an accompanying resolver 37. The resolver 37 is a variable reluctance device including a resolver stator and a resolver rotor that are assembled onto the rotor and stator, respectively, of the torque machine 35.

A high-voltage battery 25 electrically connects to an inverter module 32 via a high-voltage DC bus 29 to provide high-voltage DC electric power in response to control signals originating in the control system 10. The inverter module 32 electrically connects to the torque machine 35 via a multi-phase motor control power bus 31. The inverter module 32 is configured with suitable control circuits including power transistors, e.g., IGBTs for transforming high-voltage DC electric power to high-voltage AC electric power and transforming high-voltage AC electric power to high-voltage DC electric power. The inverter module 32 preferably employs pulsewidth-modulating (PWM) control to convert stored DC electric power originating in the high-voltage battery 25 to AC electric power to drive the torque machine 35 to generate torque. Similarly, the inverter module 32 converts mechanical power transferred to the torque machine 35 to DC electric power to generate electric energy that is storable in the high-voltage battery 25 as part of a regenerative control strategy. It is appreciated that the inverter module 32 is configured to receive motor control commands and control inverter states to provide the motor drive and regeneration functionality.

A DC/DC electric power converter 34 electrically connects to a low-voltage bus 28 and a low-voltage battery 27, and electrically connects to the high-voltage bus 29. Such electric power connections are known and not described in detail. The low-voltage battery 27 electrically connects to an auxiliary power system 45 to provide low-voltage electric power to low-voltage systems on the vehicle, including, e.g., electric windows, HVAC fans, seats, and the low-voltage solenoid-actuated electrical starter 39.

The transmission 50 preferably includes one or more differential gear sets and activatable clutches configured to effect torque transfer in one of a plurality of fixed-gear operating modes over a range of speed ratios between the engine 40 and the output member 62. The transmission 50 includes any suitable configuration, and is preferably configured as an automatic transmission to automatically shift between the fixed-gear operating modes to operate at a gear ratio that achieves a preferred match between an operator torque request and an engine operating point. The transmission 50 automatically executes upshifts to shift to an operating mode having a lower numerical multiplication ratio (gear ratio) and executes downshifts to shift to an operating mode having a higher numerical multiplication ratio. A transmission upshift requires a reduction in engine speed so the engine speed matches transmission output speed multiplied by the gear ratio at a gear ratio associated with the target operating mode. A transmission downshift requires an increase in engine speed so the engine speed matches transmission output speed multiplied by the gear ratio at a gear ratio associated with the target operating mode. An inaccurate matching of engine speed and torque with transmission speed and torque may result in a sag in vehicle speed or torque output or clutch slippage upon execution of a transmission shift event.

The driveline 60 may include a differential gear device 65 that mechanically couples to an axle 64 or half-shaft that mechanically couples to a wheel 66 in one embodiment. The driveline 60 transfers tractive power between the transmission 50 and a road surface. Powertrain system 20 is illustrative but not limiting.

The control system 10 includes a control module 12 that is signally connected to an operator interface 14. The control module 12 preferably signally and operatively connects to individual elements of the powertrain system 20 either directly or via a communications bus 18. The control module 12 signally connects to the sensing devices of each of the high-voltage battery 25, the inverter module 32, the torque machine 35, the engine 40, and the transmission 50 to monitor operation and determine parametric states thereof. The operator interface 14 of the vehicle 100 includes a plurality of human/machine interface devices through which the vehicle operator commands operation of the vehicle 100, including, e.g., an ignition switch to enable an operator to crank and start the engine 40, an accelerator pedal, a brake pedal, a transmission range selector (PRNDL), a steering wheel, and a headlamp switch. One vehicle operator command of interest is the operator torque request, which may be determined via operator inputs to the accelerator pedal and the brake pedal. The control module 12 includes controller 11 configured to control operation of the inverter module 32. The controller 11 may be co-located with the inverter module 32 or remotely located, e.g., located within the control module 12.

The powertrain system 20 includes a communications scheme including the communications bus 18 to effect communications in the form of sensor signals and actuator command signals between the control system 10 and elements of the powertrain system 20. It is appreciated that the communications scheme effects information transfer to and from the control system 10 using one or more communications systems and devices, including, e.g., the communications bus 18, a direct connection, a local area network bus, a serial peripheral interface bus, and wireless communications.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 2:
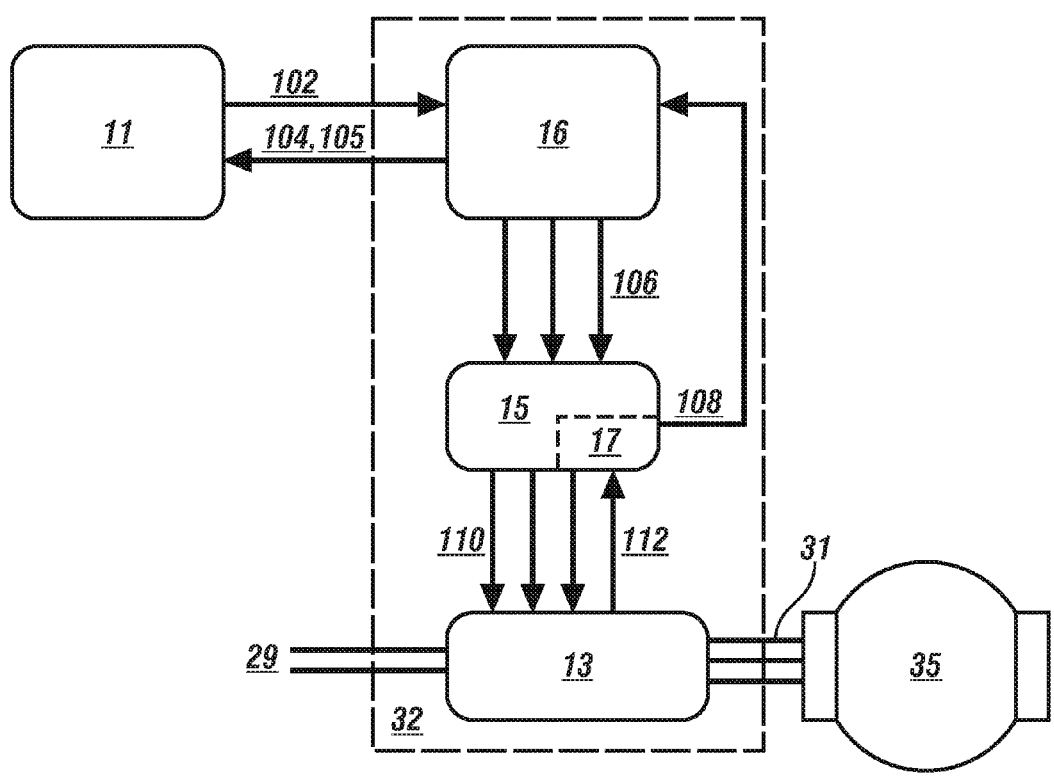
FIG. 2 illustrates a portion of a powertrain system including an electrically-powered torque machine controlled by a control system in accordance with the disclosure.

FIG. 2 schematically shows a portion of the powertrain system 20 including the electrically-powered torque machine 35 coupled to the inverter module 32 that is controlled by the controller 11 of the control system 10. The inverter module 32 includes a motor control processor (MCP) 16, a gate drive 15, and a plurality of power switches 13. The power switches 13 are IGBTs or other suitable power switch devices that are positioned between the high-voltage DC bus 29 and the multi-phase motor control power bus 31 for providing PWM electric power to the torque machine 35. In one embodiment, each power switch 13 includes collector, emitter, and gate pins, input pins for monitoring electrical current flow through the power switch 13 and desaturation, a fault output pin, and a reset/fault blanking pin. Each power switch 13 is configured to generate a fault signal 112 indicating an absence or a presence of a fault that may include desaturation. The gate drive 15 is equipped with a diagnostics circuit 17 configured to monitor the fault signals 112 of the power switches 13 and generate a fault message 108 that is communicated to the MCP 16 indicating presence or absence of desaturation faults detected by the diagnostics circuit 17.

In operation, the controller 11 generates a motor torque command 102 that is communicated to the MCP 16. The MCP 16 generates PWM duty cycle control commands 106 that are communicated to the gate drive 15 in response to the motor torque command 102. The MCP 16 generates a motor torque capability signal 104 and a motor torque achieved signal 105 that are communicated to the controller 11. The gate drive 15 generates a plurality of PWM control signals 110 to control the power switches 13 to control electric power flow between the high-voltage DC bus 29 and the multi-phase motor control power bus 31 to control operation of the torque machine 35. The torque machine 35 generates torque that is transferred to the engine 40 via the belt-alternator-starter mechanism 38. The diagnostics circuit 17 ongoingly monitors the fault signals 112 to detect presence of a desaturation fault and provide other monitoring capabilities of the power switches 13, e.g., to detect presence of a short circuit fault or an overcurrent fault.

Figure 3:
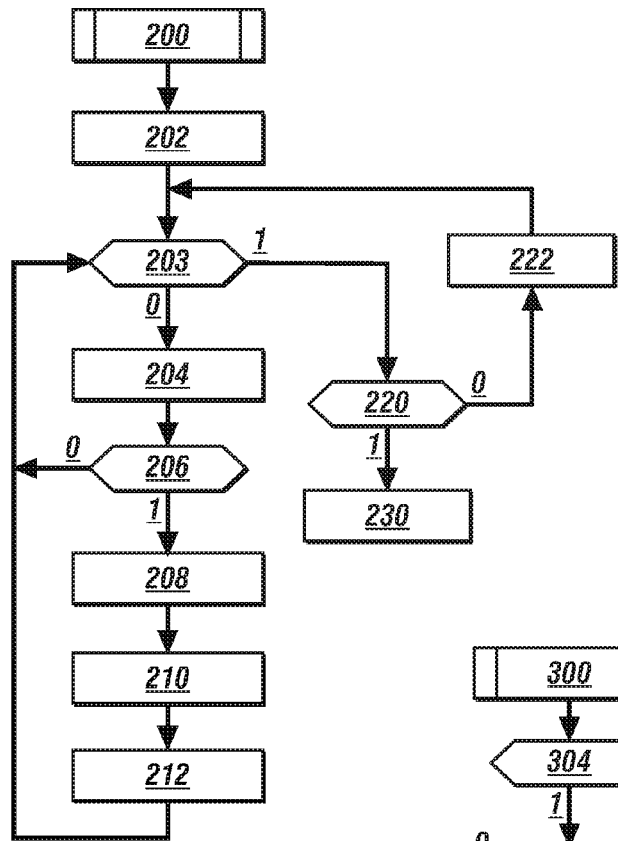
FIG. 3 illustrates a desaturation fault diagnostic scheme in a powertrain system including an electrically-powered torque machine mechanically coupled to an internal combustion engine in accordance with the disclosure.

FIG. 3 is a flowchart of a desaturation fault diagnostic scheme 200 in a powertrain system including an electrically-powered torque machine mechanically coupled to an internal combustion engine that mechanically couples to a transmission, e.g., the powertrain system 20 described with reference to FIG. 1. The desaturation fault diagnostic scheme 200 includes a process to monitor the fault signals 112 of the power switches 13 during ongoing powertrain operation. Torque output from the torque machine 35 is disabled upon detecting a pending fault associated with one of the power switches configured to control power flow to the torque machine 35. One or more retry events are executed, with a debounce time period preceding each retry event. The retry events with preceding debounce time periods are preferably iteratively executed until the pending fault clears, indicating the pending fault was not due to a fault associated with one of the inverter module 32, the torque machine 35, and the phase motor control power bus 31.

When the pending fault fails to clear during a time window, a fault associated with one of the inverter module 32, the torque machine 35, and the phase motor control power bus 31 is indicated, and remedial action is executed, including executing a complete shutdown of the torque machine 35. A pending fault is said to fail to clear during a time window when a quantity of the retry events during the time window exceeds a threshold. Table 1 is provided as a key to FIG. 3 wherein the numerically labeled blocks and the corresponding functions are set forth as follows.

TABLE 1

| BLOCK | BLOCK CONTENTS |
| --- | --- |
| 200 | Desaturation fault diagnostic scheme |
| 202 | Initialize test window counter Y; Initialize Retry counter X |
| 203 | Is Y = Y_cal? |
| 204 | Increment test window counter Y = Y + 1 Monitor hardware fault signals |
| 206 | Detect pending hardware desaturation fault? |
| 208 | Communicate pending hardware desaturation fault; Set Fault Pending flag |

TABLE 1-continued

| BLOCK | BLOCK CONTENTS |
| --- | --- |
|  | Disable PWM control signals for power switches; Set motor torque capability to 0 Nm; Disable powertrain system functions; including DFCO, autostop, and triggering backup autostart if the vehicle is in auto stop. |
| 210 | Wait debounce time period (e.g., 30 ms); Increment retry counter X = X + 1 |
| 212 | Execute Retry, including re-enabling PWM control signals for power switches 13, ramping back the motor torque capability from 0 to its normal value; Re-enable other powertrain system hybrid functions |
| 220 | Is X ≥ X_cal? |
| 222 | Report desaturation diagnostics PASS |
| 230 | Detect mature desaturation fault; Execute torque machine shutdown; Report desaturation FAULT; Illuminate MIL |

The desaturation fault diagnostic scheme 200 is iteratively executed during ongoing powertrain operation. Initially, a test window counter Y and a retry counter X are initialized to zero (202). The test window counter Y is compared to a calibratable threshold counter Y_cal (203). The calibratable threshold counter Y_cal is preferably related to an elapsed period of time, e.g., 200 ms, that is associated with an operator-discernible change in output torque.

When the test window counter Y is less than the calibratable threshold counter Y_cal (203)(0), the test window counter is incremented (Y=Y+1). The hardware fault signals, which originate in the power switches 13, are monitored (204). The hardware fault signals may indicate a pending hardware desaturation fault. If the hardware has detected a pending desaturation fault, the PWM control signals 110 to the power switches 13 are disabled. The fault action may be permanently latched or latched for a period of time depending upon specific embodiments of the power switches 13. When a pending hardware desaturation fault is detected (206)(1), a fault pending flag is set and the pending hardware desaturation fault is communicated to the MCP 16. PWM control signals 110 for all the power switches 13 are disabled. The motor torque capability 104 is set to 0 Nm. The MCP 16 disables powertrain system functions including DFCO, autostop/autostart functions in response to the communicated pending hardware desaturation fault (208). This may include commanding an autostart using the low-voltage solenoid-actuated electrical starter 39 if the engine 40 is presently stopped. The control module 12 commands an engine torque output that is responsive to an operator torque request without a torque contribution from the torque machine 35.

Operation of the functions associated with the inverter module 32 is suspended for a debounce time period, which is a calibratable period of time, e.g., 30 ms, and the retry counter is incremented (X=X+1) (210). After the debounce time period passes, a retry event is executed (212). The retry event includes re-enabling the PWM control signals 110 for the power switches 13, ramping back the motor torque capability 104 from 0 to its expected value, and re-enabling the powertrain system functions including DFCO, autostart, and autostop. This includes operating the MCP 16 to generate PWM duty cycle control commands 106 that are communicated to the gate drive 15 to generate PWM control signals 110 that activate the power switches 13 to operate the torque machine 35 to generate torque. Another iteration of the desaturation fault diagnostic scheme 200 is then executed.

When the test window counter Y is equal to the calibratable threshold counter Y_cal (203)(1), the retry counter X is compared to a calibratable threshold X_cal (220). When the retry counter X is less than the calibratable threshold X_cal (220) (0), a desaturation pass is indicated (222), and operation of the desaturation fault diagnostic scheme 200 is reinitiated. In one embodiment, a calibratable threshold X_cal may include five retry events during the 200 ms window associated with the calibratable threshold counter Y_cal. When the retry counter X is greater than the calibratable threshold X_cal (220)(1), the pending desaturation fault has matured and a desaturation fault is indicated (230). When a desaturation fault is indicated, remedial action is taken, including executing a shutdown of the torque machine 35, reporting the desaturation fault to the control module 12, and illuminating a malfunction indicator lamp, thus indicating to a vehicle operator that there is a fault in the system requiring service.

The desaturation fault diagnostic scheme 200 may be accomplished by executing first and second fault diagnostic tasks 300 and 400, respectively. The first and second fault diagnostic tasks 300 and 400 are executed to effect control of the power switches 13, execute retry events, report fault pending status, and command a shutdown of the torque machine 35 in the event of a desaturation fault.

Figure 4:
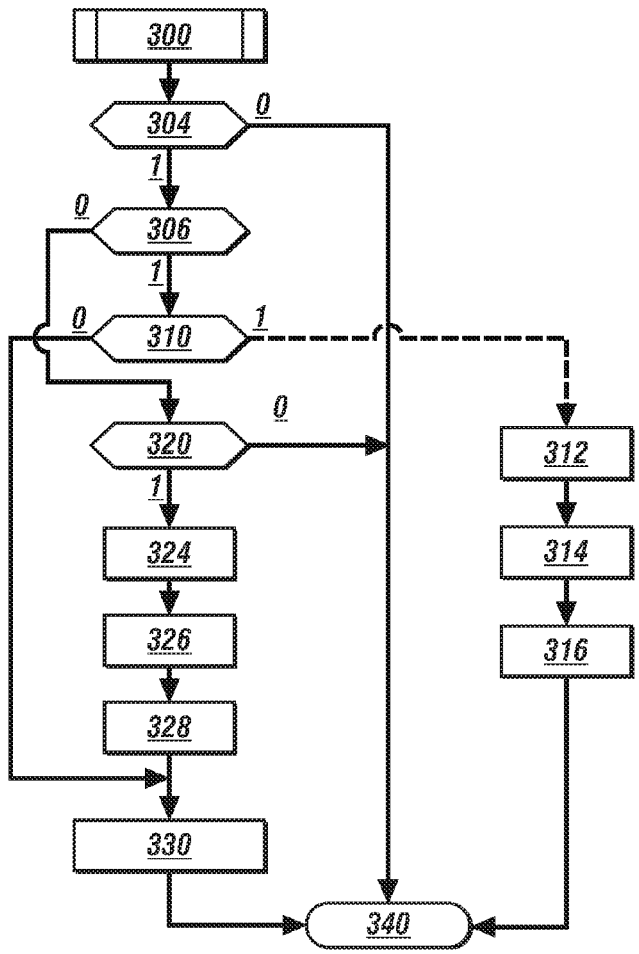
FIG. 4 illustrates a first diagnostic task for detecting immediate desaturation faults in power switches and controlling operation of the power switches in accordance with the disclosure.

FIG. 4 is a flowchart associated with execution of the first diagnostic task 300. The first diagnostic task 300 is preferably executed in a fast execution loop, e.g., once every 100 microseconds in one embodiment, and includes detecting immediate desaturation faults in the power switches 13 and controlling the power switches 13, including enabling and disabling operation of the power switches 13. Table 2 is provided as a key to FIG. 4 wherein the numerically labeled blocks and the corresponding functions are set forth as follows.

TABLE 2

| BLOCK | BLOCK CONTENTS |
|---|---|
| 300 | First diagnostic task |
| 304 | Is desaturation retry strategy enabled? AND Is the inverter condition correct for desaturation detection? |
| 306 | Is there a pending desaturation fault? |
| 310 | Is there a motor control hardware rest flag? |
| 312 | Set motor control hardware reset flag = False |
| 314 | Reset calibratable fault pending action |
| 316 | Execute motor control hardware reset, including reset low level hardware-latched fault actions to re-enable PWM control for power switches 13 |
| 320 | Has hardware detected a desaturation fault? |
| 324 | Set desaturation fault pending flag = True |
| 326 | Identify desaturation fault mode; Separate the fault mode to allow better identification of desaturation fault typing for debugging |
| 328 | Set calibratable fault pending action in response to the desaturation fault mode (to disable PWM) |
| 330 | Execute fault pending action |
| 340 | End |

In operation, the first diagnostic task 300 determines whether a retry strategy is enabled and whether the inverter condition is correct for desaturation detection (304). If not enabled or if the inverter condition is not correct for desaturation detection (304)(0), the present iteration of the first diagnostic task 300 ends with no further action (340).

The hardware fault signals 112 from the power switches 13 are monitored, and indicate whether a pending hardware desaturation fault has been detected (306). When a pending desaturation fault is indicated (306)(1), it is determined whether a motor control hardware reset flag has been set (310). When the motor control hardware reset flag has been set (310)(1), the reset hardware request flag is cleared (FALSE) (312), and a calibratable fault pending action is reset (314). The motor control hardware reset request is executed (316) and may be in the form of a high voltage to a pin on each of the power switches 13 that internally resets output of the hardware fault signal 112. This action resets the hardware fault signals 112 from the power switches 13 to re-enable operation of the power switches 13. The present iteration of the first diagnostic task 300 ends (340). When the motor control hardware reset flag has not been set (310)(0), any fault pending action is executed (330), and the present iteration of the first diagnostic task 300 ends (340).

When a pending desaturation fault is not indicated (306) (0), it is determined whether the hardware has detected a desaturation fault (320). When the hardware has not detected a desaturation fault (320)(0), the present iteration of the first diagnostic task 300 ends (340).

When the hardware has detected a desaturation fault (320) (1), the desaturation fault pending flag is set (TRUE) (324), and the desaturation fault is identified (326). Fault signals 112 from the power switches 13 may be bit-coded according to different fault modes as previously described, with a non-zero fault signal 112 indicating existence of a pending fault. This includes separating the fault mode to allow more complete identification of desaturation fault type for debugging, diagnosis and repair. A calibratable fault pending action may be set in response to the identified desaturation fault type, i.e., an overvoltage or an overcurrent condition. A calibratable fault pending action is set in response to the identified desaturation fault type (328). Fault pending action is executed (330), and the present iteration of the first diagnostic task 300 ends (340).

Figure 5:
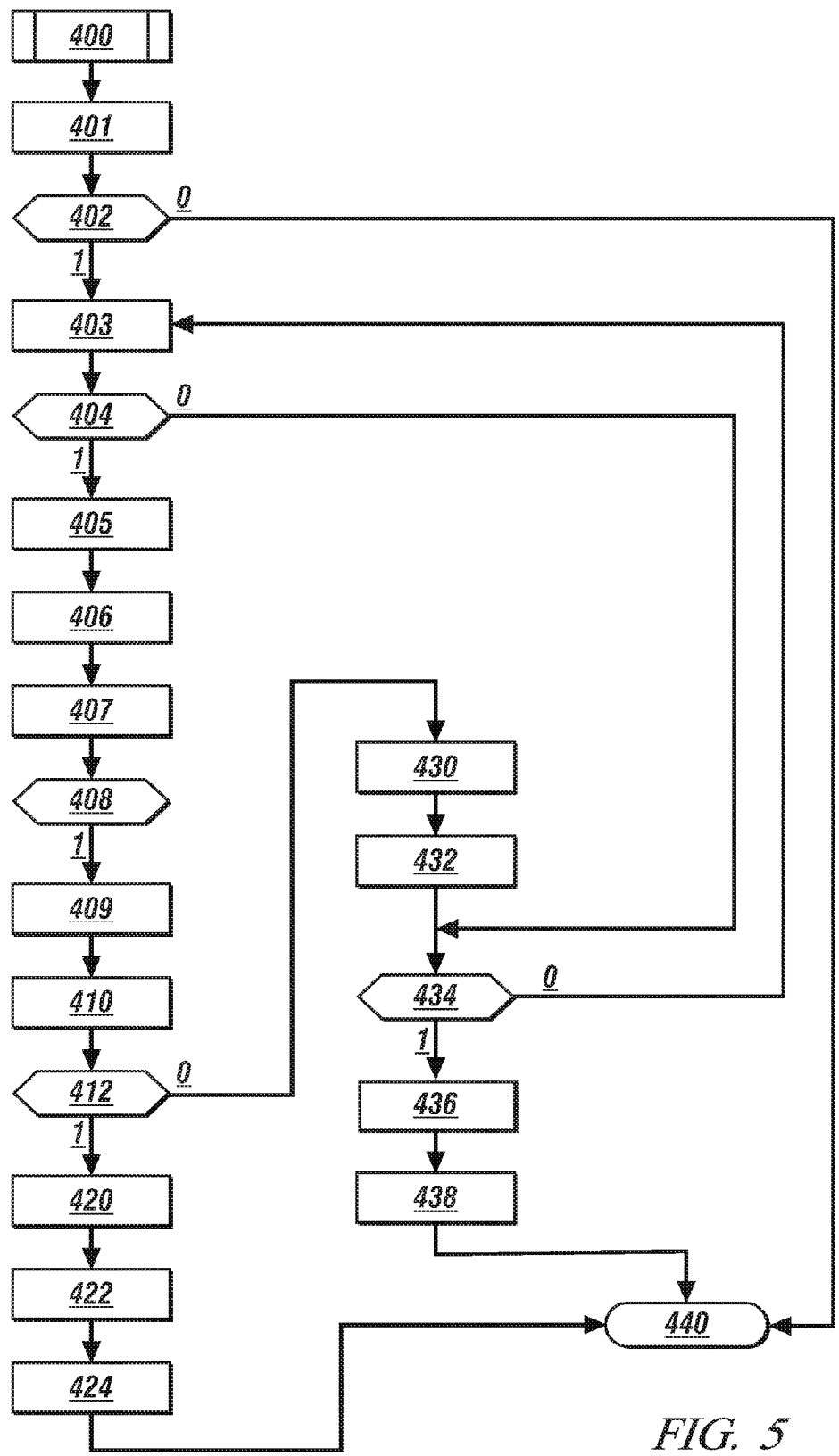
FIG. 5 illustrates a second diagnostic task for providing system level coordination and diagnostic fault debouncing, fault reporting, and torque ramping in accordance with the disclosure.

FIG. 5 depicts a flowchart configured to describe execution of the second diagnostic task 400. The second diagnostic task 400 includes system level coordination and diagnostic fault debouncing, fault reporting, and torque ramping. Table 3 is provided as a key to FIG. 5 wherein the numerically labeled blocks and the corresponding functions are set forth as follows.

TABLE 3

| BLOCK | BLOCK CONTENTS |
|---|---|
| 400 | Second diagnostic task |
| 401 | Initialize retry counter X = 0; Initialize test window counter Y = 0 |
| 402 | Check for desaturation enabling condition |
| 403 | Increment test window sample counter Y = Y + 1 |
| 404 | Is desaturation fault pending reporting from fast loop |
| 405 | Set motor torque capability to 0 thus notifying the hybrid controller of pending fault condition |
| 406 | Increment desaturation recovery timer |
| 407 | Set final calibratable desaturation fault action, depending upon the desaturation fault mode |
| 408 | Desaturation recovery timer ≥ desaturation recovery time? |
| 409 | Clear desaturation fault pending flag |
| 410 | Increment retry counter X = X + 1 |
| 412 | Is X ≥ calibrated desaturation retry count? |
| 420 | Execute information processing for a desaturation diagnostic fault; Report desaturation fault; |

TABLE 3-continued

| BLOCK | BLOCK CONTENTS |
| --- | --- |
|  | Select final desaturation fault action; Illuminate MIL |
| 422 | Reset desaturation recovery timer |
| 424 | Execute final desaturation fault action; Shut down torque machine |
| 430 | Set motor control hardware reset flag = True; |
| 432 | Reset desaturation recovery timer; Ramp back motor torque capability |
| 434 | Is Y > Test Window Limit Calibration (Y_cal) ? |
| 436 | Execute information processing for a PASSED desaturation diagnostic test; Report desaturation test PASS |
| 438 | Reset X, Y<br>X = 0; Y = 0 |
| 440 | End second diagnostic task |

The second diagnostic task 400 is preferably executed in a slow execution loop, e.g., once every 2 ms in one embodiment. Operation of the second diagnostic task 400 includes initializing a retry counter (X=0) and a test window counter (Y=0) (401), and a check for desaturation fault monitoring enabling conditions (402), which operation continuing (1) when the enabling conditions are met, and operation ending (0) when the enabling conditions are not met. The test window counter is incremented (Y=Y+1) (403). It is determined whether there is a desaturation fault pending, e.g., as indicated when the desaturation fault pending flag, as described with reference to FIG. 4, element 326 (404). If the enabling conditions are not met (402)(0) or there is no desaturation fault pending flag set (404)(0), the present iteration of the second diagnostic task 400 ends with no further action (440).

When the desaturation fault pending flag is set (404)(1), the motor torque capability is set to 0 Nm of torque output (405), a recovery timer is incremented (406), and a desaturation fault action is set, dependent upon the desaturation fault mode (407). The system operates with the motor torque capability set to 0 Nm for a debounce time indicated by a predetermined recovery time, e.g., 30 ms in one embodiment (408). After the predetermined recovery time has elapsed (408)(1), the desaturation fault pending flag is cleared, allowing a retry event (409). The retry counter is incremented (X=X+1) (410), and X is compared to a calibrated retry count (412). When the retry counter X is greater than the calibrated retry count (412)(1), information processing associated with a desaturation diagnostic fault is executed (420). This includes reporting the desaturation fault to the MCP 16 and the control module 10, selecting appropriate final fault action in response to the desaturation fault, and illuminating a malfunction indicator lamp (MIL) (420). The desaturation recovery timer is reset (422), and the desaturation fault action is executed, including executing torque machine shutdown (424). The present iteration of the second diagnostic task 400 ends with no further action (440).

When the retry counter X is less than the calibrated retry count (412)(0), motor control hardware reset flag is set (=TRUE) (430). This includes resetting low level hardware-latched fault actions to re-enable the PWM for operating the power switches, as described with reference to FIG. 4, element 316. The desaturation recovery timer is reset and motor torque capability is ramped back to its normal level (432). The test window counter Y is compared to a calibration limit, i.e., Y_cal (434), and if less than the calibration limit (434)(0), operation of the second diagnostic task begins anew by incrementing the test window counter Y (403) and determining whether there is a desaturation fault pending (404). When the test window counter Y is greater than the calibration limit, i.e., Y_cal (434)(1), information processing is executed to indicate that the system has passed the desaturation fault diagnostic test, which is reported to the MCP and the control module 10 (436). The retry counter and the test window counter are reset (X=0, Y=0) (438), and the present iteration of the second diagnostic task 400 ends with no further action (440).

The desaturation fault diagnostic scheme 200 is robust to falsely triggered faults caused by electromagnetic interference (EMI) by allowing retry events prior to commanding shutdown of the torque machine 35 in response to a pending fault. When a pending fault is caused by a hardware malfunction such as a short circuit in the power switches or the torque machine, the fault can be expected to be detected frequently after an immediate pending fault action. However, if a pending fault is caused by other, intermittent non-fault actions, e.g., electromagnetic interference (EMI), the desaturation fault diagnostic scheme 200 allows the system to respond to pending faults without causing a complete motor shutdown.

While the desaturation fault diagnostic scheme 200 is executing a retry event, performance of the powertrain system 20 is affected since the torque machine 35 is temporarily disabled. Operation of the powertrain system 20 is controlled to manage torque in response to an operator torque request, including mitigating effects of reduced torque capability and disabling powertrain functionality including inhibiting occurrence of engine autostop and DFCO, and adjusting engine torque in response to the operator torque request. When a retry event succeeds after an intermittent fault detection, the motor torque capability is ramped up to prevent a torque machine torque surge that may affect driveability. Such operation may include resetting the hardware in the gate drive 15, including resetting latched power switches 13 without a need to reinitialize the motor controller 16. Thus a complete system power down is unnecessary. The retry timer is calibratable to allow flexibility with the calibratable retry timer to accommodate heat dissipation requirements in the power switches 13. The X-of-Y debouncing logic allows flexible calibration of quantity of retry times using the retry counter X within the period of time defined by the calibratable test window counter Y. The desaturation fault diagnostic scheme 200 includes a fault recording strategy that logs Figure-of-Merit information to facilitate debugging a desaturation fault regardless of whether the fault matures. The Figure-of-Merit is preferably saved in nonvolatile memory for retrieval after key-off power-down events.

To save throughput and better coordinate both the software and hardware mitigation effort, the desaturation fault diagnostic scheme 200 may be executed using the first and second fault diagnostic tasks 300 and 400, with the first diagnostic task 300 preferably executed in a fast execution loop and the second diagnostic task 400 preferably executed in a slow execution loop.

On a vehicle powertrain system including an electrically-powered torque machine, the desaturation fault diagnostic scheme 200 includes a system level retry functionality that coordinates software and hardware actions in a torque machine controller and a hybrid controller, thus delaying or avoiding an immediate torque machine shutdown fault action in response to a detected fault. This improves system-level robustness of desaturation fault monitoring and detection.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a powertrain system including a torque machine mechanically coupled to an internal combustion engine, comprising:
    upon detecting a pending hardware desaturation fault associated with one of a plurality of power switches configured to control power flow to the torque machine,
    employing a diagnostic circuit to disable control signals to all of the power switches,
    executing a motor control hardware reset to re-enable operation of all of the power switches, and
    executing retry events comprising
        re-enabling the control signals to all the power switches,
        ramping torque capability for the torque machine from zero to its expected value and
        re-enabling disabled powertrain system functions, wherein the retry event: are iteratively executed with a debounce time period preceding each retry event; and
    detecting, by the diagnostic circuit, a presence of a mature hardware desaturation fault associated with the power switch when a quantity of the retry events during a time window exceeds a threshold.

2. The method of claim 1, wherein each retry event further includes:
    commanding power flow to the torque machine; and
    monitoring the power switches configured to control the power flow to the torque machine.

3. The method of claim 2, wherein commanding power flow to the torque machine comprises controlling activation of the power switches.

4. The method of claim 2, wherein monitoring the power switches comprises monitoring power flow through each of the power switches.

5. The method of claim 1, further comprising disabling an autostop function associated with the internal combustion engine upon detecting the pending hardware desaturation fault associated with one of the power switches.

6. The method of claim 1, further comprising disabling a deceleration fuel cutoff function associated with the internal combustion engine upon detecting the pending hardware desaturation fault associated with one of the power switches.

7. The method of claim 1, further comprising immediately enabling an autostart function associated with the internal combustion engine upon detecting the pending hardware desaturation fault associated with one of the power switches.

8. The method of claim 1, wherein employing the diagnostic circuit to disable control signals to all of the power switches comprises setting a motor torque capability function to 0 Nm.

9. The method of claim 1, further comprising discontinuing executing the retry events when the pending fault clears.

10. The method of claim 1, wherein detecting a pending hardware desaturation fault associated with one of the plurality of power switches configured to control power flow to the torque machine comprises monitoring fault signals from the plurality of power switches.

11. Method for operating a powertrain system including a torque machine mechanically coupled to an internal combustion engine, comprising:
    monitoring fault signals output from a plurality of power switches configured to control power flow to the torque machine;
    employing a diagnostic circuit to disable torque output from the torque machine upon detecting a pending fault associated with one of the power switches;
    executing a motor control hardware reset to re-enable operation of all of the power switches to execute retry events;
    iteratively executing the retry events subsequent to disabling torque output comprising
        re-enabling the control signals to all the power switches,
        ramping torque capability for the torque machine from zero to its expected value and
        re-enabling disabled powertrain system functions; and
    detecting, by the diagnostic circuit, a mature fault when a quantity of the retry events during a time window exceeds a threshold.

12. The method of claim 11, wherein iteratively executing the retry events includes iteratively executing the retry events with a debounce time period preceding each retry event.

13. The method of claim 12, wherein iteratively executing the retry events comprises waiting the debounce time period before commanding power flow to the torque machine.

14. The method of claim 13, wherein commanding power flow to the torque machine comprises controlling activation of the power switches.

15. The method of claim 11, further comprising disabling an autostop function associated with the internal combustion engine upon detecting the pending fault associated with one of the power switches.

16. The method of claim 11, further comprising disabling a deceleration fuel cutoff function associated with the internal combustion engine upon detecting the pending fault associated with one of the power switches.

17. The method of claim 11, further comprising immediately enabling an autostart function associated with the internal combustion engine upon detecting the pending fault associated with one of the power switches.

18. The method of claim 11, further comprising discontinuing executing the retry events when the pending fault clears.

19. Method for operating a powertrain system including a torque machine mechanically coupled to an internal combustion engine, comprising:
    disabling, by a diagnostic circuit, torque output from the torque machine, executing a motor control hardware reset to re-enable operation of all of the power switches to execute retry events, and executing retry events upon detecting a pending fault associated with a power switch configured to control power flow to the torque machine, said retry events comprising
        re-enabling the control signals to all the power switches,
        ramping torque capability for the torque machine from zero to its expected value and
        re-enabling disabled powertrain system functions;
    discontinuing executing the retry events when the pending fault clears; and
    reporting presence of a mature fault associated with the power switch when a quantity of the retry events during a time window exceeds a threshold.

* * * * *